July 5, 1966  E. S. BECKJORD ETAL  3,259,766
THERMIONIC NUCLEAR REACTOR

Filed Feb. 25, 1964  6 Sheets-Sheet 1

Fig. 1.

INVENTORS
ERIC S. BECKJORD
PAUL J. FELLOWS
ROBERT R. HOBSON
BY
ATTORNEY

July 5, 1966         E. S. BECKJORD ETAL         3,259,766
                  THERMIONIC NUCLEAR REACTOR
Filed Feb. 25, 1964                          6 Sheets-Sheet 2

INVENTORS
ERIC S. BECKJORD
PAUL J. FELLOWS
ROBERT R. HOBSON
BY
ATTORNEY

July 5, 1966  E. S. BECKJORD ETAL  3,259,766
THERMIONIC NUCLEAR REACTOR

Filed Feb. 25, 1964  6 Sheets-Sheet 4

INVENTORS
ERIC S. BECKJORD
PAUL J. FELLOWS
BY ROBERT R. HOBSON

ATTORNEY

July 5, 1966   E. S. BECKJORD ETAL   3,259,766
THERMIONIC NUCLEAR REACTOR
Filed Feb. 25, 1964   6 Sheets-Sheet 5

INVENTOR.
ERIC S. BECKJORD
PAUL J. FELLOWS
ROBERT R. HOBSON
BY
ATTORNEY

July 5, 1966 E. S. BECKJORD ETAL 3,259,766
THERMIONIC NUCLEAR REACTOR
Filed Feb. 25, 1964 6 Sheets-Sheet 6

INVENTORS
ERIC S. BECKJORD
PAUL J. FELLOWS
BY ROBERT R. HOBSON
ATTORNEY

United States Patent Office 3,259,766
Patented July 5, 1966

3,259,766
THERMIONIC NUCLEAR REACTOR
Eric S. Beckjord, Pittsburgh, Pa., and Paul J. Fellows and Robert R. Hobson, San Jose, Calif., assignors to the United States of America as represented by the United States Atomic Energy Commission
Filed Feb. 25, 1964, Ser. No. 347,320
9 Claims. (Cl. 310—4)

The invention described herein was made in the course of, or under, Contract Number AT(04–3)–189, Project Agreement No. 32, with the United States Atomic Energy Commission.

The present invention relates generally to nuclear reactors and in particular to nuclear reactors that convert the heat developed from the fission of fissile material directly into electrical energy and, in addition, are compact and relatively lightweight.

The principle of energy conversion, i.e., thermionic conversion, utilized in this invention is disclosed in U.S. Letters Patent No. 2,980,818 granted to G. R. Feaster, April 18, 1961. Energy conversion is achieved by introducing cesium vapor at low pressure between closely spaced electrodes comprising an emitter electrode of relatively high work function and operating at a high temperature, in the range of 1700–2225° C. and a collector electrode of relatively low work function and operating at a relatively low temperature, approximately 800–1000° C. less than that of the emitter electrode. Electrons, which are, in effect, "boiled" off of the emitter, are transported through ionized cesium vapor and dissipate their energy at the collector creating a potential difference between the electrodes causing a current to flow in the circuit. For each individual converter, the current generated is rather high, being of the order of 10–20 amps per square centimeter of emitter area while the voltage generated is rather low, being of the order of 0.5 to 1.0 volt.

It can be seen that to control and maintain high collector temperatures suitable cooling means and materials must be devised. Present thermionic converters use either water or thermal radiators to dissipate excess heat. At the high temperatures encountered in a device of this type, the use of water as a coolant for a compact reactor would be impractical because of its relatively low boiling point. For the high power densities encountered in this type of reactor, thermal radiators for each converter cell would likewise be impractical. It can also be seen that the low voltages and high currents encountered in present thermionic converters, large electrical bus bars are necessary to not only carry the current but reduce voltage drop. Naturally, the larger bus bars increase the weight and take up greater volume within the reactor which effects are extremely undesirable and disadvantageous in mobile use and particularly for space applications. Although nuclear energy has been suggested as a heat source for thermionic conversion and certain primitive configurations of reactors have been proposed, there exists a pressing need for a reactor structure that combines light weight, compactness, and simplicity of reactor control.

In embodiments of a nuclear reactor utilizing the principle of thermionic energy conversion, this invention provides, basically, a plurality of tubular thermionic fuel elements connected at one end to individual cesium reservoirs and bundled together to form, with the help of filler blocks and radial support and locator bands, a cylindrically shaped nuclear reactor core cooled by a liquid metal, preferaby sodium, and contained within a cyindrical housing around the exterior of which are a plurality of moveable neutron reflector segments or "shoes" used to vary reactivity within the reactor core. The tubular thermionic fuel elements each contain a number of individual thermionic converter cells connected in series. Each individual converter cell comprises, essentially, a cylindrical collector electrode concentric with and surrounding, in spaced realtionship to form a cesium vapor filled gap, a cylindrical emitter electrode can containing a fissile fuel. The individual thermionic converter cells are series connected by electrically connecting the emitter of one converter cell to the collector of one of the adjacent converter cells by especially adapted connector means.

Although series connection of individual converter cells within the tubular thermionic fuel element increases the output voltage over that of a single converter cell by a factor equal to the number of cells connected in series, a further doubling of the reactor output voltage is achieved in accordance with this invention by utilizing two types of fuel elements appropriately arranged. In one type of fuel element the emitter of the converter cell at one end of the fuel element is grounded to the reactor housing while the collector of the converter cell at the opposite end of this fuel element is connected to the fuel element electrical output lead. Whereas, in the other type of fuel element the reverse is effected. The collector, rather than the emiter, of the converter at one end of the fuel element is grounded to the reactor housing, while the emitter, rather than the colletcor of the converter cell at the opposite end of the fuel element is connected to the electrical output lead. The voltage, therefore, across the respective electrical output leads of the two types of fuel elements is double the voltage across a single fuel element, i.e., between ground (reactor housing) and the electrical output lead of one fuel element. Of course, with this multifold increase in voltage, the size and weight of the electrical bussing, i.e., bus bars and ancillary connectors, is substantially reduced. A further weight reduction is achieved without sacrificing structural strength by virtue of a method of constructing the upper reactor vessel head incorporating a plurality of I beams for support of the reactor core which, at the same time, provide means for penetration of the reactor enclosure by the cesium vapor supply tubes.

It should be noted that practical efficiencies of about 15–30% are obtainable with cesium vapor thermionic converters. With this in mind, it can be seen that in addition to producing electrical energy directly, the surplus heat may be put to additional uses increasing overall efficiency of the system. It is estimated that the overall efficiency of a conventional electrical steam turbine generating system is about 30%. By combining conventional power generation with thermionic conversion, overall efficiencies of the order of 35–45% can easily be achieved.

Therefore it is an object of this invention to provide a lightweight, compact, and easily controllable nuclear reactor for generating electrical power directly from the heat generated by the fission of fissile material.

A further object of this invention is to provide a direct conversion thermionic nuclear reactor that is cooled by a liquid metal.

A still further object of this invention is to provide a direct conversion thermionic nuclear reactor containing a plurality of fuel elements wherein are contained a number of series connected converter cells.

Yet another object of this invention is to provide, in a direct conversion thermionic nuclear reactor, two types of fuel elements, one in which the emitter is grounded and the other in which the collector is grounded to effect an increase in output voltage.

Another object of this invention is to provide a reactor vessel head for support of the reactor core that is of a construction achieving lightweight and allowing penetration of cesium supply tubes to the thermionic fuel elements.

It is again another object of this invention to provide a cylindrical thermionic converter reactor core of tubular thermionic fuel elements in tangential contact held in place with filler blocks and radial support and locating bands.

Still another object of this invention is to provide an improved electrical connection of the end converter cell at the electrical output end of a thermionic fuel element to an electrical output lead.

Further, it is an object of this invention to establish an electrical connection of the electrically grounded end of an end fuel element to the reactor housing through especially adapted liquid metal and cesium vapor supply tubes.

As a further object of this invention, provided is a reactor reflector control system comprising a liquid metal cooled stationary neutron reflector disposed about the outside of the reactor vessel wall and a plurality of thermal radiation cooled movable neutron reflector portions rotating outwardly to regulate reactivity within the reactor core.

Again, a further object of this invention is to provide effective seals for the bearings of the rotatable neutron reflector portions.

Another object of this invention is to provide a direct conversion thermionic nuclear reactor whose waste heat may be utilized for other purposes such as space heating, production of steam, and generation of power by conventional means.

Other objects and advantages will be apparent to one skilled in the art from the following description taken with the accompanying drawings in which.

In operation, the reactor disclosed in this application has its electrical output leads coming out of the bottom of the reactor housing, with its cesium reservoirs at the top of the housing. References to upper and lower parts of the invention will be made with this in mind.

Figure 1:
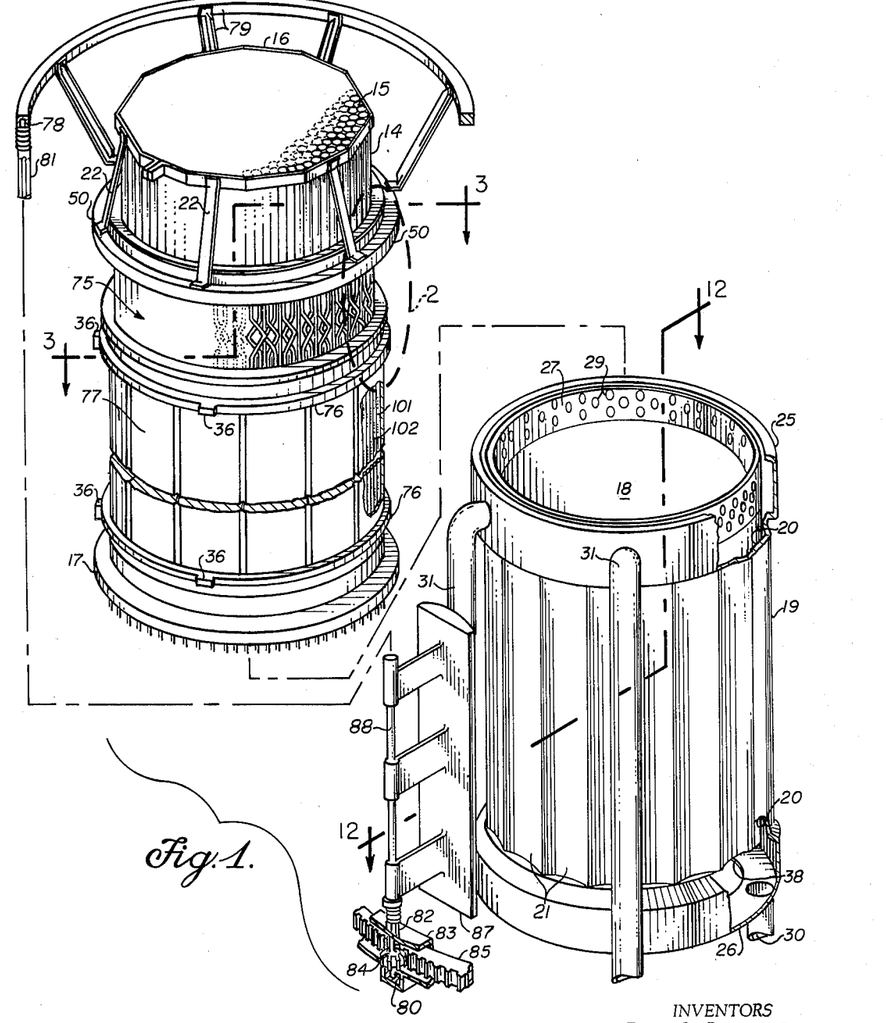
FIGURE 1 is an exploded view of a reactor core, housing and reflector control in accordance with the invention.
Figure 4:
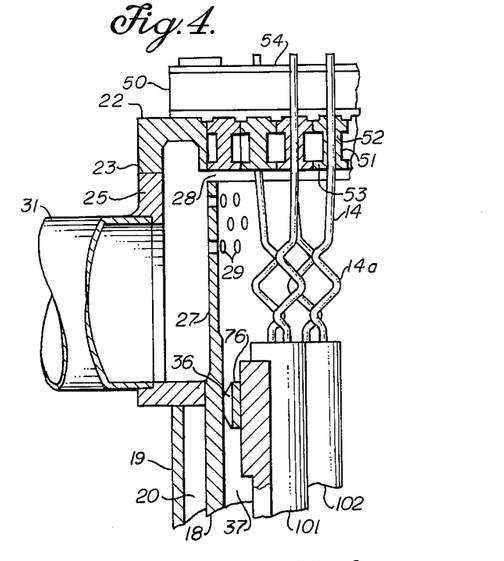
FIGURE 4 is a detailed illustration of a portion of a longitudinal section through the reactor vessel housing showing the construction of the I beam vessel head and upper coolant manifold.

Referring to FIG. 1, the preferred embodiment comprises a reactor core 75 containing a plurality of emitter grounded fuel elements 101 and a similar number of collector grounded fuel elements 102 in parallel packed and ordered array, held in place by radial support bands 76 to form a generally cylindrical shape with the help of a plurality of filler blocks 77. Said reactor core 75 is supported at its grounded end by an upper vessel head 50 and by means of cesium vapor supply tubes 14 attached to each tubular fuel element which penetrates and are affixed to said upper vessel head 50 in sealed relation as shown in FIG. 4. An expansion loop 14a is provided in each cesium vapor supply tube 14 to allow for thermal expansion and contraction of reactor core 75 containing fuel elements 101 and 102. Exterior to upper vessel head 50, cesium vapor supply tubes 14 are connected to individual cesium reservoirs 15, a plurality of which is held in place by retaining band 16 and a plurality of assembly supports 22. The electrical output or lower ends of fuel elements 101 and 102 are supported by lower planar vessel head 17 by means of support tubes 132 (FIG. 5) attached to each tubular fuel element and each containing the power output lead of the fuel element. Said support tubes 132 penetrate and are affixed and sealed to lower vessel head 17. To facilitate the separation of bussing (not shown) of emitter grounded fuel element electrical leads 103 from the collector grounded fuel element electrical leads 104, for this embodiment, electrical leads 103 are made substantially shorter than electrical leads 104.

Still referring to FIG. 1, reactor core 75 is contained in an elongated generally cylindrical reactor housing 18 fitted with an upper coolant manifold portion 25 disposable around the cesium tube, i.e., grounded, end of the reactor core, a lower coolant manifold 26 for disposition around the electrical lead end of the reactor, a coolant distributor 27 concentric within and in spaced relation with upper coolant manifold 25, and generally cylindrical fixed reflector 19 concentric about the exterior of housing 18 and provided with channel 20 for the flow of liquid metal coolant between reactor housing 18, and fixed reflector 19. Coolant distributor 27 is formed as an extension of reactor housing 18 and comprises space 28 and a plurality of openings 29 for the purpose of distributing the flow of liquid metal coolant equally throughout reactor core 75 to effectively cool the exterior of the fuel elements. Provided on the exterior of said fixed reflector 19 are inwardly concave longitudinal scallops 21 for receiving in close proximity to the outer surface of fixed reflector 19, the faces of neutron reflector shoes 87 as discussed more fully hereinafter. Connected to the lower coolant manifold 26 are several conduits 30 for exhausting the liquid metal coolant from the reactor to a heat extracting means (not shown) such as, a thermal radiator or heat exchanger of a steam generating facility, etc., and to a pump or pumps (not shown) returning the liquid metal coolant to upper coolant manifold 25 through several liquid metal supply conduits 31 as may be required for variously desired purposes.

Figure 2:
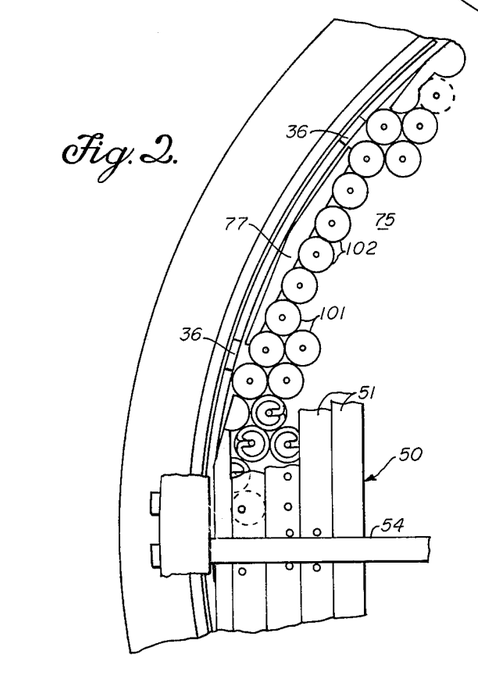
FIGURE 2 is a partial section through the reactor at line 2—2.

By referring to FIGURE 4 provision for joining reactor housing 18 to upper vessel head 50 can best be seen. The outer periphery of upper vessel head 50, is adapted to be sealed and affixed by means of final assembly ring 22 to the upper edge of upper coolant manifold 25 to form final assembly joint 23. Referring to FIGURES 1, 2 and 4, reactor core 75 when assembled is axially aligned within reactor housing 18 by several equally spaced radial locating pads 36 affixed to radial support bands 76, said pads serving also to provide an annular cylindrical space 37 for the flow of liquid metal coolant between the exterior of reactor core 75 and interior of reactor core housing 18. To completely seal reactor core 75 within reactor housing 18, lower vessel head 17, at the electrical output end of the reactor, is sealed and affixed to the inner circumference 33 of lower coolant manifold 26. As noted, supra, support tubes 132 penetrate and are sealed and affixed to said lower vessel head 17 to achieve a liquid metal tight reactor housing as by welding or brazing.

Figure 3:
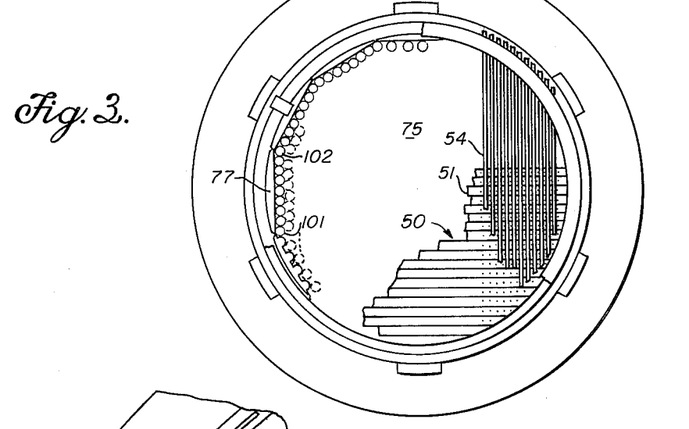
FIGURE 3 is a transverse section of the reactor taken at line 3—3 showing the plan view of the upper vessel head defining the arrangement of the vessel head I beams and reinforcing I beams.

Constructional details of upper vessel head 50 can best be seen by observing FIGS. 3 and 4. Basically, vessel head 50 comprises a layered plurality of parallel I beams 51 penetrated by cesium vapor supply tubes 14. The layer of I beams 51 is reinforced by cross-layered head reinforcing I beams 54. I beams 51 are arranged with their web 52 parallel and flanges 53 aligned to define an upper and lower plane with tips of flanges 53 touching and sealed and affixed together, preferably by a full penetration weld continuous along the full length of the I beam to provided a continuous planar head plate. Cesium vapor supply tubes 14 penetrate and are sealed and affixed to upper vessel head 50 through holes drilled perpendicular through flanges 53 and parallel to and through the center line of web 52. The holes containing cesium vapor supply tubes 14 are drilled in rectangular array so that cesium vapor supply tubes 14 pass between head reinforcing I beams 54. A ring is welded to the periphery of the layer of I beams 51 as well as to the ends of beams 54 beyond which said ring projects to provide a mounting rim engageable by the upper edge of manifold 25.

Figure 5:
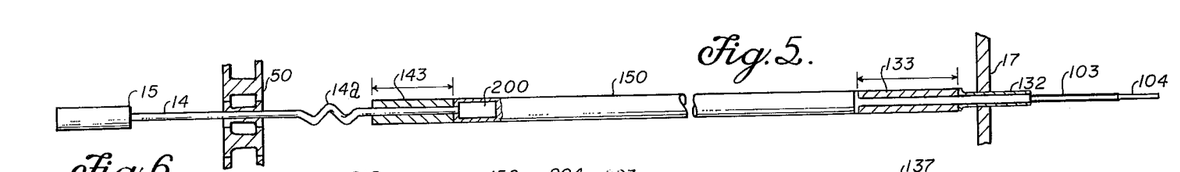
FIGURE 5 is a longitudinal view of a typical tubular fuel element.

Reference to FIG. 2 discloses the shapes required for filler blocks 77 which support and space tubular fuel elements 102 and 101. Basically, filler blocks 77 possess variously shaped longitudinal ridges and grooves which are designed to retain fuel elements 101 and 102 in orderly relationship and also to facilitate transition from a dodecagonal section to a circular section essentially paralleling the interior contours of reactor housing 18. The thermionic fuel elements 101 and 102 possess certain constructional features in common as illustrated in FIG. 5. Generally, both types of fuel elements comprise an elongated outer tubular casing 150 containing a number of individual series connected fueled converter cells 200, a neutron reflector section 133 proximate the electrical output end and a neutron reflector 143 proximate the grounded end, a cesium reservoir 15 connected to the grounded end of the fuel element by cesium vapor supply tube 14 having expansion coil 14a, which penetrates and is affixed to upper vessel head 50 in sealed relation, and an electrical lead 103 or 104, depending upon the type of fuel element, sealed and enclosed within electrical output end support tube 132 which penetrates and is affixed to lower vessel head 17. For withstanding the high temperature and corrosive effects of liquid sodium, niobium has been found satisfactory as the material forming outer tube 150. However, other materials resistive to such corrosive and high temperature environment would be equally satisfactory.

Figure 10:
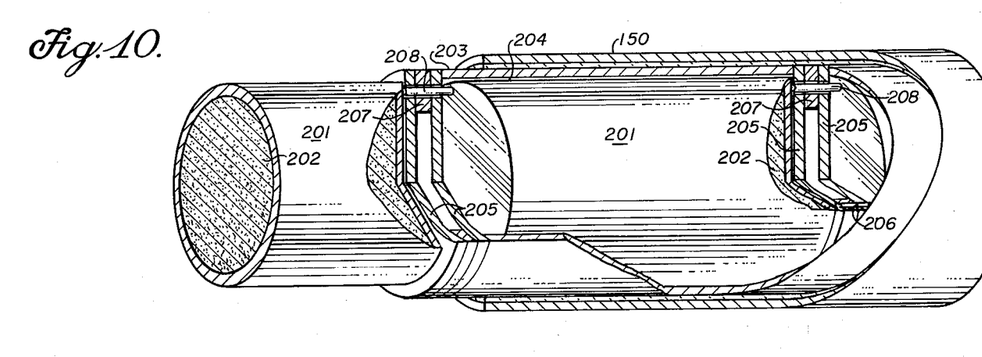
FIGURE 10 is a cut-away view of an individual converter cell inside the fuel element.
Figure 11:
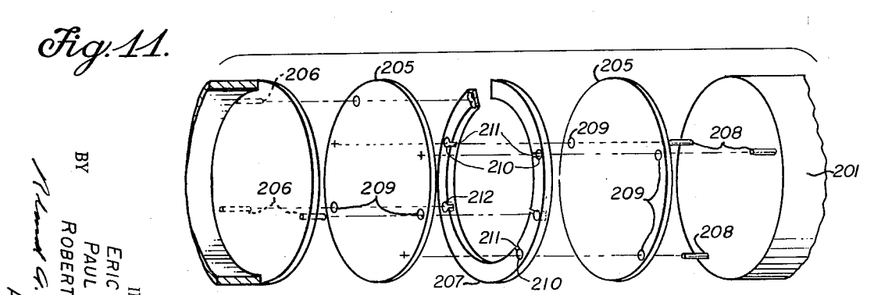
FIGURE 11 is an exploded view of the parts forming the electrical connection and insulated spacer assembly between each converter cell.

The construction of individual converter cells 200, which is common toboth emitter grounded fuel element 101 and collector grounded fuel element 102 can best be seen in FIG. 10. The typical converter cells 200 basically comprise a cylindrical tubular casing emitter 201 concentric with and in spaced relationship within a cylindrical tubular collector 203. Cesium vapor at low pressure is introduced in space 204 between emitter 201 and collector 203 by the construction of the fuel elements described above. Fissile fuel 202 is sealed in emitter 201. The material of emitter 201 should preferably be able to withstand high temperatures, at least approximately 2300° C. and have a relatively high work function. Tungsten has been found to perform satisfatcorily at the high temperatures encountered although rhenium, niobium or other material of high melting point and high work function will be equally satisfactory. Collector 203, in the form of a cylinder, is closed at each end by an end plate 205. Referring to FIG. 11, end plates 205 are provided with holes 209 of substantially larger diameter than the diameter of pins 206 and 208 which holes are located about the periphery of end plate 205 so as to be concentric with said pins 206 and 208.

The collector should be formed from material capable of withstanding temperatures of the order of 1000–2000° C. and have, preferably, a work function lower than that of the emitter. Molybdenum has been found to perform satisfactorily although, at the operating temperature of the collector electrode the cesium tends to form a film on the surface of the collector giving it essentially the same work function as cesium. Therefore, any material which does not appreciably interact with cesium and has a high melting point would be satisfactory, for example, tantalum or zirconium. At each end of emitter 201 are respectively at least 3 emitter support pins 206 and 208 equiangularly spaced proximate the periphery of each end and parallel the longitudinal axis of emitter 201. To avoid interference with the collector support pins of the adjacent cells, the support pins at one end of the emitter are situated about the periphery at an angle which bisects the angle of separation of the pins at the opposite end of the emitter. Thus, a pin supporting one emitter at, say, its lower end, will be situated halfway between pins supporting, say, the upper end of its neighboring emitter. Each converter cell 200 is electrically insulated from its adjacent cell by insulated spacer ring 207. Spacer rings fabricated of sapphire, high purity $Al_2O_3$, BeO, $ThO_2$, or $Y_2O_3$ have proved satisfactory. The use of $Al_2O_3$ is specially advantageous because it has almost the identical coefficient of thermal expansion as niobium. Series connection of each cell is achieved through support pin 208 at one end of the emitter 201 which pin 208 passes through and is concentric with substantially larger diameter hole 209 in end plate 205 of collector 203. The purpose of the substantially larger diameter of hole 209 is to permit cesium vapor to pass into the cell as well as electrically insulate pin 208 from collector 203. Insulator spacer ring 207 is also provided with a hole 210 substantially larger in diameter than pin 208 and a passageway 211 for the flow of cesium vapor through the converter cells. Pin 208 continues through insulated spacer ring 207 until it maintains electrical and supporting contact with end plate 205 of the adjacent converter cell collector. The end of the emitter distal to pin 208 is supported by pin 206 which also passes through a hole 209 in end plate 205 of its collector which hole is substantially larger in diameter than pin 206 so that cesium vapor will be able to pass into the cells as well as electrically insulate pin 206 from its collector. Pin 206 passes through said hole 209 in end plate 205 and is seated in a hole 212 partially drilled through insulated spacer ring 207. Passage 211 in space ring 207 permits the flow of cesium vapor through the converter cells.

Figure 7:
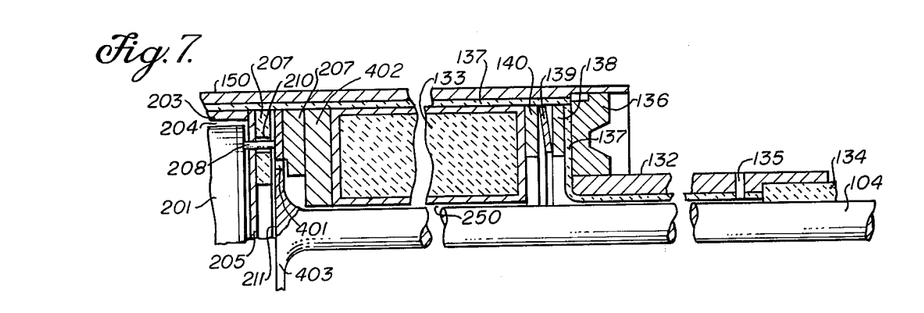
FIGURE 7 is a detailed illustration of a collector grounded fuel element showing the electrical connection at the electrical output end.
Figure 9:
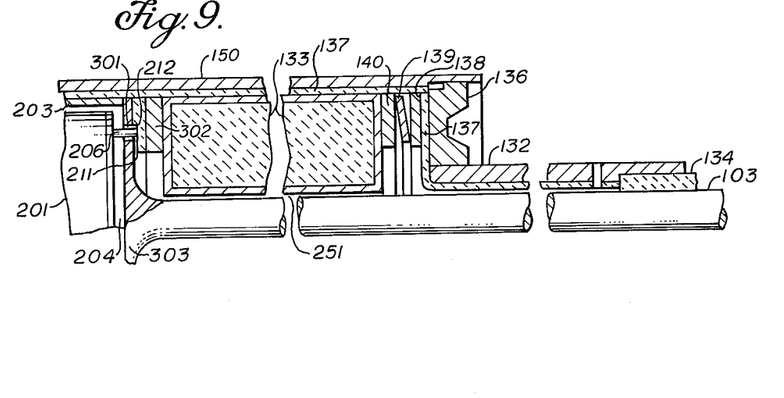
FIGURE 9 is a detailed illustration of an emitter grounded fuel element showing the electrical connection at the electrical output end.

Referring to FIGS. 7 and 9 showing the electrical output ends of fuel elements 101 and 102 respectively, it will again be noted that certain construction features are common to both types of fuel elements. It will be seen that both fuel elements have a support tube 132 having fission product vent 135 just inside of an electrical lead setal 134, both being proximate the end of the support tube exterior to the lower vessel head 17 (FIG. 5). Fission product vent 135 is connected to a processing system (not shown) external to the reactor to remove fissides that diffuse out of the fissile fuel and leak into the cesium vapor to impair its thermionic properties. At the distal end of support tube 132 and proximate the end of tube 150 is annular flange 136 which is sealably affixed to support tube 132 and outer fuel element tube 150 to rigidly hold support tube 132. Electrical insulating material 137 is disposed immediate the interior of outer tube 150, flange 136 and support tubes 132. The material forming insulating material 137 can be the same as that forming insulated spacer ring 207, supra. Against said insulation 137 where it is supported by flange 136 is washer 138 against which washer 138 presses helical spring 139 whose distal end presses against insulated spacer washer 140 in turn supported by neutron reflector 133.

Significant distinguishing features of the electrical output connection of collector grounded fuel element 102 can be seen in FIG. 7. External to the fuel element, electrical lead 104 of collector grounded fuel element 102 is made longer than electrical lead 103 of the respective emitter grounded fuel element (FIGS. 5 and 9). Within the fuel element, the end of electrical lead 104 is enlarged to form a flange 403 whose diameter equals the inside diameter of insulation 137. Individual converter cells within fuel element 102 (FIGS. 6 and 7) are arranged so that pins 208 which make electrical contact between emitter and adjacent collector of successive elements are at the end of the emitter facing the electrical output end of the fuel element. The last emitter at the electrical output end, rather than contacting the nonexistent next adjacent collector, contacts and is supported by flange 403 of electrical lead 104. Flange 403 presses against insulated spacer ring 207 and is pressed against by equalizer spacer ring 402 in series with neutron reflector 133 and the sequence of components noted above which are common to both fuel elements. Hole 401 is provided in flange 403 to permit the flow of cesium vapor through the converter cells, around annular space 250, between insulation 137 and electrical lead 104, and out fission product vent 135.

The distinguishing features of the electrical output connection of an emitter grounded fuel element 101 can be seen in FIG. 9. Exterior to the fuel element, electrical lead 103 of emitter grounded fuel element 101 is shorter than electrical lead 104 a collector grounded fuel element (FIG. 7). Within the fuel element, the end of electrical lead 103 forms a flange 303 whose diameter equals the inside diameter of insulation 137 and is contiguous and in electrical contact with the collector of the end cell at the electrical output end. Individual converter cells within fuel element 101 are arranged so that pins 206, supporting the emitter, which are insulated from the collector of an adjacent converter cell, are at the end of the emitter facing the electrical output end of the fuel element. Pin 206 passes through the substantially larger diameter hole 301 in flange 303 and is seated in a partially penetrant hole 212 in insulated spacer ring 207. Against insulated spacer ring 207 presses equalizer spacer ring 302 which in turn is held in place and pressed against by neutron reflector 133 and the chain of parts noted above which are common to both fuel elements. The hole 301 in flange 303, hole 210 and passage 211 in spacer ring 207 permit the flow of cesium vapor through the converter cells, around annular space 251 between insulation 137 and electrical lead 103 and out fission product vent 135.

Figure 6:
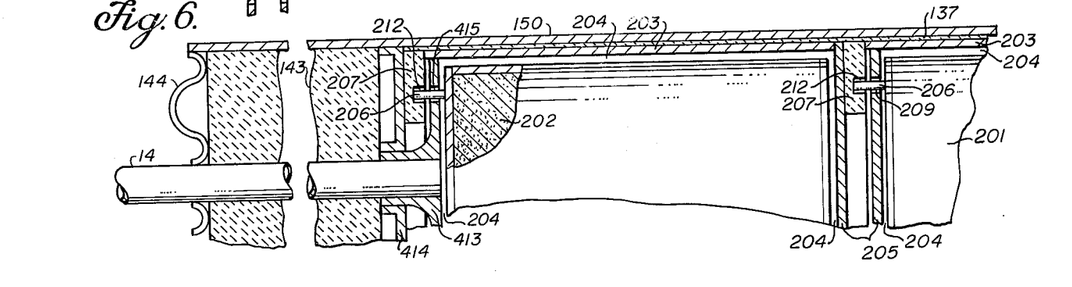
FIGURE 6 is a detailed illustration of a collector grounded fuel element showing the electrical connection at the grounded end.
Figure 8:
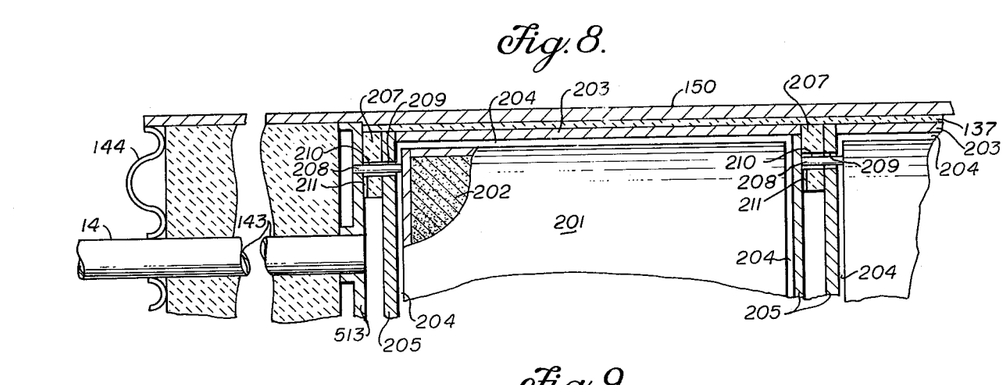
FIGURE 8 is a detailed illustration of an emitter grounded fuel element showing the electrical connection at the grounded end.

Referring to FIGS. 6 and 8 showing the grounded ends of fuel elements 101 and 102 respectively, it will be noted that here also certain construction features are common to both fuel elements. It can be seen that both fuel elements have a cesium supply tube 14 whose axis is coincident with the fuel element axis and surrounded by cylindrical annular netruon reflector 143 proximate the end and contained within fuel element outer tube 150 and held in place by combined expansion seal and diaphram 144.

The distinguishing features of the grounded end connection of collector grounded fuel element 102 can be seen in FIG. 6. Flange 413 is affixed proximate the interior end of cesium vapor supply tube 14 and is contiguous and in electrical contact with collector 203 of the end converter cell. About the neck of flange 413 and holding neutron reflector 134 in place is support flange 414 of a diameter equal to the inside diameter of fuel element outer tube 150. Spacer ring 207 rests against support flange 414 and is situated between flange 413 and said support flange 414. Pin 206 of the end converter cell emitter passes through a substantially larger diameter hole 415 in flange 413 and is seated in the partially drilled hole 212 in spacer ring 207.

The distinguishing features of the grounded end connection of emitter grounded fuel element 101 can be seen in FIG. 8. Flange 513 is affixed proximate the interior end of cesium vapor supply tube 14 and serves to hold neutron reflector 143 in place as well as provide support and electrical connection for pin 208 of the end converter cell emitter. The diameter of flange 513 is equal to the inside diameter of fuel element outer tube 150. Flange 513 is analogous to the collector of the next adjacent converter cell so that spacer ring 207 performs its typical function of electrically insulating the collectors from each other and at the same time permitting the flow of cesium vapor to the cell through passage 211 and hole 210.

Figure 12:
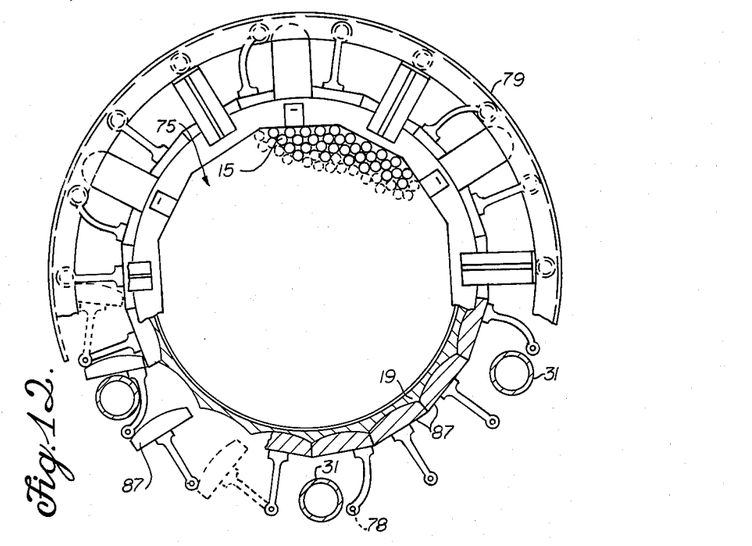
FIGURE 12 is a transverse section through the body of the reactor taken at line 12—12 showing the arrangement of the neutron reflector control system about the exterior of the reactor vessel.

Details of the construction of the reactor control system are illustrated in FIG. 12. Characteristically, the control system comprises a liquid metal cooled and generally cylindrical fixed reflector 19 external to and concentric with reactor housing 18 and having a plurality of longitudinally aligned, inwardly concave, cylindrical scallops 21 for receiving, in close proximity, the faces of rotatable neutron reflector shoes 87.

The rotatable reflector portion of the control system (FIG. 13) comprises a reflector shoe 87 supported by a shaft whose longitudinal axis is parallel to the longitudinal cylindrical axis of reactor core 75, reactor housing 18 and fixed reflector 19. Shaft 88 is supported at its upper (cesium reservoir) end by bearing 78, said bearing 78 being enclosed in upper bearing seal 81 (FIG. 1) and located in ring support structure 79, said ring support assembly 79 being supported upon reactor head 50 approximately coplanar with cesium reservoir 15 and retaining band 16. Upper bearing seal 81 comprises an upper bellows section 90 attached to ring support structure 79. The distal end of upper bellows section 90, in turn, is attached to longitudinally fluted section 91, in turn attached to lower bellows section 92, which in turn, is attached to shaft 88.

Figure 13:
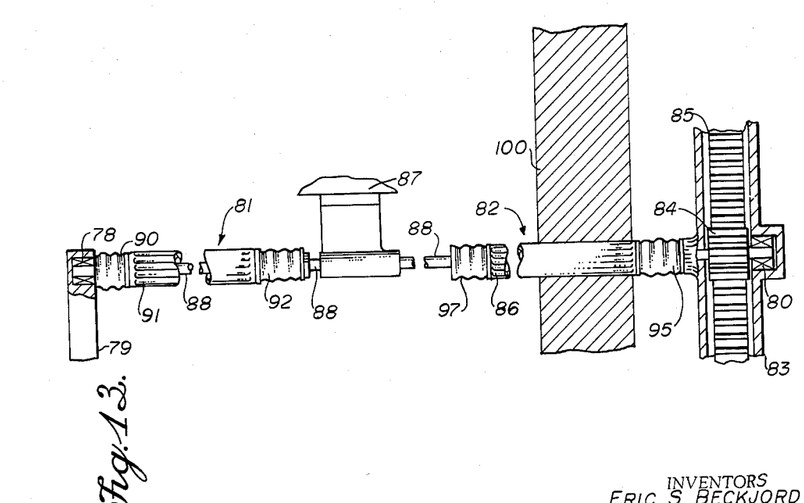
FIGURE 13 is a detailed illustration of the rotatable reflector shaft showing the flexible seals thereof.

The lower (electrical output) end of shaft 88 is support by lower bearing 80 located in ring gear housing 83. Proximate the lower end of shaft 88 is affixed gear 84 which engages motor driven ring gear 85. Ring gear 85 is driven by an electric drive motor (not shown) which, as said ring gear 85 turns, rotates, in concert, each shaft 88 and attached reflector shoe 87 approximately 60 degrees outward from reactor vessel 18 and fixed reflector 19. Lower bearing 80, gear 84 and ring gear 85 are in a sealed environment maintained by flexible lower seal 82. Lower seal 82 comprises a lower bellows 95 attached to ring gear housing 83, the distal end of said bellows 95 is attached to longitudinal fluted section 86, which in turn, is attached to upper bellows section 97 which, in turn, is attached to shaft 88. Lower flexible seals 82 are made sufficiently long to penetrate biological shield 100 which separates ring gear housing 83 from the reactor.

To operate the reactor, neutron reflector shoes 87 are slowly rotated from their outermost position away from reactor core 75 toward the cylindrical scallops 21 in the outer surface of fixed reflector 19 by rotating motor driven ring gear 85 with the electric drive motor (not shown) in response to reactivity detection and control means (not shown). As reflector shoes 87 begin to nest in cylindrical scallops 21, more neutrons emitted from fissile material 202 within reactor core 75 are reflected into said core. A point will be reached where the number of neutrons reflected will be sufficient to maintain a self-sustained fission reaction in fissile fuel 202 contained in emitters 201. The chain reaction is regulated by moving reflector shoes 87 either in or out to maintain an emitter temperature of the order of 1800 to 2000° C. resulting from the heat released upon fission. The temperature of collector 203 is maintained at a lower temperature by regulating the flow of liquid metal coolant through the reactor. Preferably, the collector should be about 800–1100° C. cooler than the emitter. The only moving contact within the reactor occurs at bearing 78. Since bellows 90 of flexible seal 81 is attached to reflector support ring structure 79 and bellows 92 of said seal 81 is attached to shaft 88, seal 81 is flexed torsionally upon rotation of shaft 88 with torsional stresses partially relieved by the flutes on longitudinally fluted section 91 running the length of the section.

As the reactor core temperature rises, its thermal expansion is taken up both by expansion coils 14a in cesium vapor supply tubes 14 and filler blocks 77. As reactor core 75 expands radially, the tapered edges of filler block 77 move outward.

Also, as the reactor core temperature rises, cesium reservoirs 15 at the top of the reactor are heated by conductive and convective transfer of heat from the reactor core 75. The cesium vapor generated in reservoir 15 flows through cesium vapor supply tube 14 into its attached fuel element and diffuses down through space 204 between emitter 201 and collector 203, through hole 210 and passage 211 in insulated spacer ring 207, through the substantially larger hole 209 for pins 206 and 208 in end plate 205 of collector 203, through hole 401 in flange 403, through annular spaces 250 and 251 of fuel elements 102 and 101 respectively and finally out through fission product vent 135 to a fission product processing system (not shown).

As the temperature of the emitter of each individual converter cell rises to about 1800 to 2000° C. electrons will begin to "boil" off the emitter, having a high work function, and flow toward the collector coated with cesium and having a lower work function. Thus a potential difference is created by virtue of the different work functions of the emitter material and cesium coated collector which will cause an electrical current to flow when the collector and emitter electrodes are connected together through an external circuit.

In the case of emitter grounded fuel element 101, the emitter 201 in the end cell at the cessium tube (grounded) end of the fuel element will be at the same potential as the reactor housing 18 because of its electrical connection through pin 208, flange 513 (FIG. 8) and, respectively, through fuel element outer tube 150 to the liquid metal coolant and cesium vapor supply tube 14 to upper vessel head 50, both of which are in electrical contact, i.e., at a common potential with reactor housing 18. Reactor housing 18 can, in turn, be connected to ground.

Because of its lower work function, collector 203 in the end cell at the cesium tube (grounded) end of the fuel element will be at a lower potential than its emitter 201. Likewise, the emitter of the next adjacent converter cell will be at the same potential as the collector of the end cell by virtue of its electrical connection through its pin 208. In a similar manner, the adjacent cells are connected in series thus decreasing their potential below that of reactor housing 18 by a factor equal to the number of converter cells in series. At the electrical output end of emitter grounded fuel element 101, lead 103 will be at the same potential as the collector of the end cell at the electrical output end by virtue of its electrical connection through flange 303 (FIG. 9). The open circuit voltage of lead 103 is thus below that of the reactor housing 18 by a value equal to the voltage of one converter cell multiplied by the number of converter cells in the fuel element.

In the case of collector grounded fuel element 102, the collector 203 of the end cell at the cesium tube (grounded) end of the fuel element will be at the same potential as reactor housing 18 because of its electrical connection through flange 413 (FIG. 6) and, respectively, through flange 414, fuel element outer tube 150 to the liquid metal coolant and cesium vapor supply tube 14 to upper vessel head 50, both of which are in electrical contact with reactor housing 18.

Because of its higher work function, emitter 201 in the end cell at cesium tube (grounded) end of the fuel element will be at a higher potential than its collector 201. Likewise, the collector of the next adjacent converter cell will be at the same potential as the emitter of the end cell by virtue of its electrical connection through pin 208. In a similar manner, the adjacent cells are connected in series thus increasing their potential above that of reactor housing 18 by a factor equal to the number of converter cells in series. At the electrical output end of collector grounded fuel element 102, lead 104 will be at the same potential as the emitter of the end cell at the electrical output end by virtue of its electrical connection through flange 403 (FIG. 7) in series with pin 208. The open circuit voltage of lead 104 is thus above that of the reactor housing 18 by a value equal to the voltage of one converter cell multiplied by the X number of converter cells in the fuel element.

Therefore, with each type of fuel element containing equal numbers of converter cells, the voltage across leads 103 and 104 will be double the voltage across either lead and the reactor housing 18 (ground).

Electrical leads 103 can be electrically bussed together by various means well known in the art as can leads 104.

The following tabulated data illustrates a concrete embodiment of a 1 mwe. thermionic reactor:

Reactor output power ----- 1 mwe.
Converter cell:
    Emitter—O.D. -------- 0.46 in.
        Outside length (min.). 0.92 in.
    Emitter temperature ---- 1800 deg. C.
    Collector temperature --- 1100 deg. C.
    Centerline temperature--- 2350 deg. C.
    Collector electrical power 10.0 watt/cm.$^2$.
    Converter net efficiency-- 15%.
    Provision for power
      flattening (and emitter
      area) --------------- 1.33.
Fuel element:
    Tube O.D. ----------- 0.60 in.
    Fuel element total power 1.18 kwe.
Reactor assembly:
    Core length ---------- 17.5 in.
    Core diameter -------- 19.5 in.
    Total number thermionic
      fuel elements -------- 937.
    Reactor thermal power--- $7.32 \times 10^3$ kwt.
    Gross electrical power -- $1.1 \times 10^3$ kwe.
    Net electrical power ---- $1.0 \times 10^3$ kwe.
    Output voltage -------- 24 volts.
    Weight --------------- 2700 lbs.
Materials:
    External reflector ------ BeO (thickness).
    Fuel ----------------- $UO_2$ (or UC) Enrichment.
    Emitter -------------- W.
    Collector ------------ Mo.
    Converter insulation ---- $Al_2O_3$ or BeO.
    Fuel element tube ------ Nb–1% Zr.
    Coolant -------------- Na.
    Vessel, pipes, etc. ------ Nb–1% Zr.

While one embodiment of the present invention has been shown and described, further embodiments or combinations of those described herein will be apparent to one skilled in the art without departing from the spirit of the invention or from the scope of the appended claims.

What is claimed is:

1. In a thermionic nuclear reactor in combination, a plurality of elongated tubular thermionic nuclear fuel elements arranged and retained in ordered array with means forming a generally cylindrical reactor core, a sealed vessel enclosing said reactor core including a generally cylindrical central portion disposed concentrically about said core and having upper and lower head portions, said upper head portion comprising a plurality of I beams arranged with webs parallel and flanges aligned to define a vessel head having an upper and lower plane with said flanges sealed and affixed together, a plurality of spaced apart reinforcing I beams affixed to said upper plane at right angles to said vessel head I beams, a ring affixed and sealed to the periphery of said vessel head I beams to form a circular sealed upper vessel head, manifold means for circulating a liquid metal coolant through said vessel to contact said fuel elements, a neutron reflector disposed about the central portion of said vessel including portions movable into the neutron field of said core effective to control the reactivity thereof.

2. The combination according to claim 1 wherein each of said elongated tubular fuel elements comprises means defining an outer tube, a plurality of series connected nuclear fuel containing thermionic converter cells enclosed in said outer tube, means defining a reservoir containing thermionic emission promoting material included with means defining a conduit fluidly connecting said reservoir to said thermionic nuclear fuel element, means defining electrical connections at each end of said tubular fuel element for extraction of electrical power therefrom.

3. The combination according to claim 2 wherein the thermionic emission promoting material is cesium.

4. In a thermionic nuclear reactor in combination, a plurality of elongated tubular thermionic nuclear fuel elements arranged and retained in ordered array, with means forming a generally cylindrical reactor core, a sealed vessel enclosing said reactor core, including a generally cylindrical central portion disposed concentrically about said core and having upper and lower head portions, said upper head portion comprises a plurality of I beams arranged with webs parallel and flanges aligned to define a vessel head having an upper and lower plane with said flanges sealed and affixed together, a plurality of spaced apart reinforcing I beams affixed to said upper plane at right angles to said vessel head I beams, means defining penetrations perpendicular to said vessel head I beam flanges and parallel to and through the center line of the web of said vessel head I beam and between said reinforcing I beams, a ring affixed and sealed to the periphery of said vessel head I beams to form a circular sealed upper vessel head, manifold means for circulating a liquid metal coolant through said vessel to contact said fuel elements, and a neutron reflector disposed about the central portion of said vessel, including portions movable into the neutron field of said core, effective to control the reactivity thereof.

5. In a thermionic nuclear reactor in combination, a plurality of elongated tubular thermionic nuclear fuel elements arranged and retained in ordered array, with means forming a generally cylindrical reactor core, a sealed vessel enclosing said reactor core, including a generally cylindrical central portion disposed concentrically about said core, and having upper and lower head portions, manifold means for circulating a liquid metal coolant through said vessel to contact said fuel elements, and a neutron reflector disposed about the central portion of said vessel, comprising a generally cylindrical fixed portion disposed about the central portion of said vessel, a plurality of rotatable neutron reflector shoes, means defining a shaft, and bearings affixed to said reflector shoes, means defining a support for said bearings, means defining a flexible seal affixed to said support and affixed to said shaft, means defining a gear system for the rotation of said reflector shoes into the neutron field of said core effective to control the reactivity thereof.

6. The combination according to claim 5 wherein said flexible seal includes a generally cylindrical elongated tube, means defining an expansible bellows section proximate each end of said tube, and a plurality of parallel longitudinal indented flutes extending the length of the central portion of said tube between said expansible bellows effective to reduce the torsional stress thereof.

7. In a thermionic nuclear reactor, in combination, a plurality of elongated tubular thermionic nuclear fuel elements arranged and retained in ordered array, a plurality of series connected nuclear fuel containing thermionic converter cells enclosed in said nuclear fuel elements, each of said fuel elements including means defining a reservoir containing thermionic emission promoting material and means defining a conduit fluidly connecting said reservoir to said thermionic nuclear fuel element, a plurality of elongated cylindrical-formed filler blocks having a generally plano-convex cross section disposed about said plurality of fuel elements to form a generally cylindrical reactor core, a sealed vessel enclosing said reactor core including a generally cylindrical central portion disposed concentrically about said core and having upper and lower head portions, an upper manifold means proximate said upper head portion of said sealed vessel and a lower manifold means proximate said lower head portion of said sealed vessel for circulating a liquid metal coolant through said vessel to contact said fuel elements, a generally cylindrical neutron reflector disposed about the central portion of said vessel, a plurality of individually rotatable neutron reflector portions movable into the neutron field of said core effective to control the reactivity thereof.

8. In a thermionic nuclear reactor, in combination, a plurality of elongated tubular thermionic nuclear fuel elements arranged and retained in ordered array, a plurality of series connected nuclear fuel containing thermionic converter cells enclosed in said nuclear fuel element, each of said fuel elements including means defining a reservoir containing thermionic emission promoting material and means defining a conduit fluidly connecting said reservoir to said thermionic nuclear fuel element, a plurality of elongated cylindrical formed filler blocks having a generally plano-convex cross section disposed about said plurality of fuel elements to form a generally cylindrical reactor core, a sealed vessel enclosing said reactor core including a generally cylindrical central portion disposed concentrically about said core and having upper and lower head portions, said upper head portion having means defining sealed penetrations for said conduit fluidly connecting said reservoir to said thermionic nuclear fuel element, an upper manifold means proximate said upper head portion of said sealed vessel and a lower manifold means proximate said lower head portion of said sealed vessel for circulating a liquid metal coolant through said vessel to contact said fuel elements, a generally cylindrical neutron reflector disposed about the central portion of said vessel, a plurality of individually rotatable neutron reflector portions movable into the neutron field of said core effective to control the reactivity thereof.

9. In a thermionic nuclear reactor, in combination, a plurality of elongated tubular thermionic nuclear fuel elements arranged and retained in ordered array, a plurality of series connected nuclear fuel containing thermionic converter cells enclosed in said nuclear fuel elements, including means defining a reservoir containing thermionic fission promoting material and means defining a conduit fluidly connecting said reservoir said thermionic nuclear fuel elements, a plurality of elongated cylindrical-formed filler blocks having a generally plano-convex cross section disposed about said plurality of fuel elements to form a generally cylindrical reactor core, a sealed vessel enclosing said reactor core including a generally cylindrical central portion disposed concentrically about said core and having upper and lower head portions, said upper head portion having means defining sealed penetrations for said conduit fluidly connecting said reservoir to said thermionic nuclear fuel elements, an upper manifold means proximate said upper head portion of said sealed vessel and a lower manifold means proximate said lower head portion of said sealed vessel for circulating a liquid metal coolant through said vessel to contact said fuel elements, a generally cylindrical neutron reflector disposed about the central portion of said vessel, means defining a ring gear disposed proximate the lower end of said reactor vessel, a plurality of individually rotatable neutron reflectors, means defining gears affixed to said rotatable neutron reflectors and engageable with said ring gear to rotate said rotatable neutron reflectors in concert into the neutron field of said core to control reactivity thereof.

References Cited by the Examiner

UNITED STATES PATENTS

| | | | |
|---|---|---|---|
| 3,113,091 | 12/1963 | Rasor et al. | 176—52 X |
| 3,164,525 | 1/1965 | Wetch et al. | 176—33 |
| 3,176,165 | 3/1965 | Lawrence | 310—4 |
| 3,211,930 | 1/1965 | Clement et al. | 310—4 |

OTHER REFERENCES

A paper by Herman Miller before the Atomic Industrial Forum, Nov. 6, 1961, on Nuclear Thermionic Space Power Systems, pages 1–4.

Nuclear Science and Engineering: vol. 10, 1961, pages 173 to 181. Thermionic Reactor Systems by R. C. Howard.

REUBEN EPSTEIN, *Primary Examiner.*